United States Patent [19]

Ashkenazi

[11] Patent Number: 4,776,316

[45] Date of Patent: Oct. 11, 1988

[54] WAFERING DEVICE AND METHOD OF USING SAME

[76] Inventor: Brian I. Ashkenazi, 10430 Wilshire Blvd. #306, Los Angeles, Calif. 90024

[21] Appl. No.: 43,692

[22] Filed: Apr. 29, 1987

[51] Int. Cl.⁴ .............................................. B28D 1/06
[52] U.S. Cl. ............................................. 125/18; 51/400
[58] Field of Search .................... 125/18; 51/400, 401

[56] References Cited

U.S. PATENT DOCUMENTS

| | | | |
|---|---|---|---|
| 81,986 | 9/1868 | Crane | 51/401 |
| 2,479,929 | 8/1949 | Harris | 51/401 |
| 3,168,087 | 2/1965 | Anderson | 125/16 R |
| 3,263,669 | 8/1966 | Ashley | 125/16 R |
| 3,272,195 | 9/1966 | Myer et al. | 125/16 R |
| 3,597,884 | 8/1971 | Kaarlela | 51/401 |
| 4,092,971 | 6/1978 | Viscount | 125/16 R |
| 4,172,440 | 10/1979 | Schneider et al. | 125/18 |
| 4,187,828 | 2/1980 | Schmid | 125/18 |
| 4,287,869 | 9/1981 | Schmid | 125/16 R |
| 4,387,698 | 6/1983 | Bustany | 125/18 |

Primary Examiner—Robert P. Olszewski
Attorney, Agent, or Firm—Blakely, Sokoloff, Taylor & Zafman

[57] ABSTRACT

An apparatus and method for wafering an ingot of semiconductor material. Wafering blades are fabricated from one or more layers of a fiber reinforced plastic tape and coated with an abrasive material which is embedded into the exposed flat surfaces of the blades. An assembly of such blades is used in a wafering device in which the blades are reciprocated while the ingot is plunged against the cutting edges of the blades. The primary cutting action occurs as exposed ends of the fiber material at the blade edges contact the ingot. The abrasive material on the blade sides provides additional side cutting action and produces a polished finish on the surfaces of the resulting wafers.

32 Claims, 3 Drawing Sheets

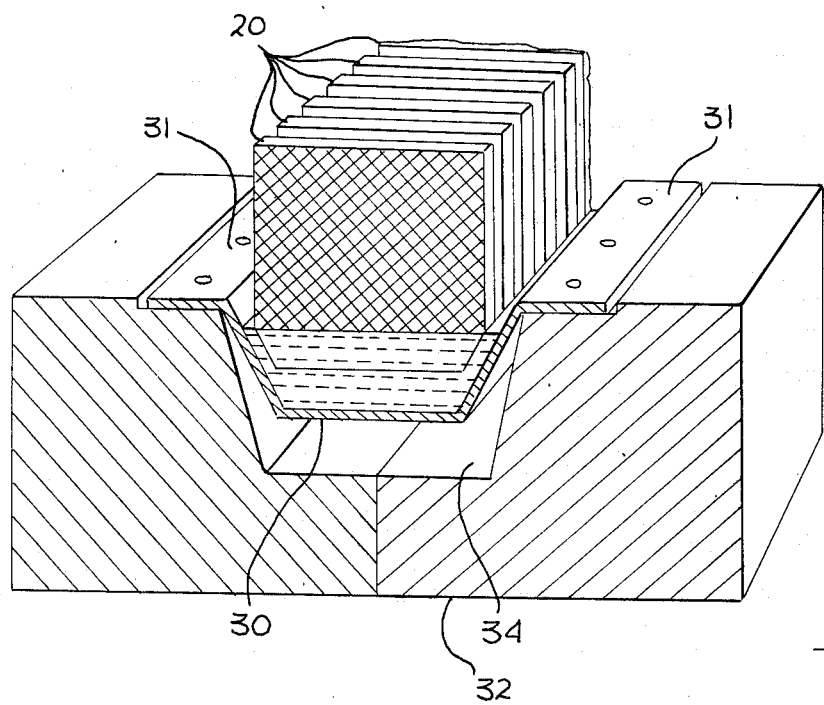
_Fig. 4_
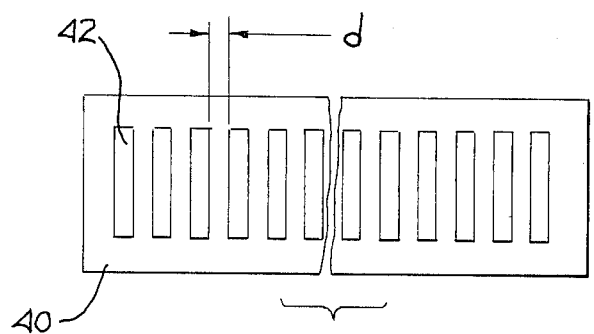
_Fig. 5_
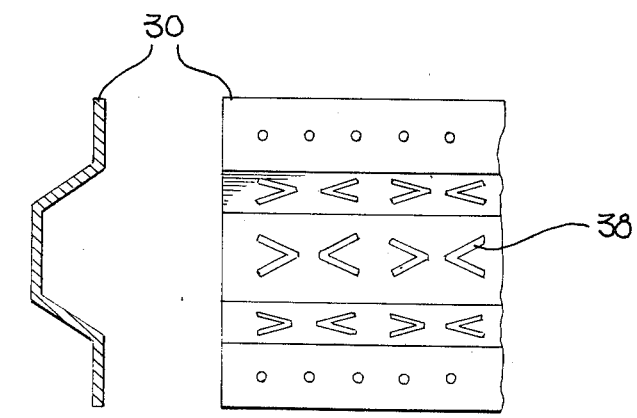
_Fig. 6a_  _Fig. 6b_

WAFERING DEVICE AND METHOD OF USING SAME

BACKGROUND

1. Field of the Invention

This invention relates to cutting of crystalline materials such as quartz, silicon and gallium arsenide and, more particularly, to slicing ingots of such materials into thin wafers.

2. Prior Art

Integrated circuits are typically manufactured on a substrate of monocrystalline quartz, silicon, gallium arsenide, or other semiconducting material. Fabricating the substrate presents unique manufacturing challenges since the material is hard and brittle and must be sliced into very thin wafers. Numerous devices and techniques have been developed for performing this difficult process.

One such technique employs a thin, circular, high-strength steel blade having a central hole whose circumference is coated with an abrasive, such as diamond dust. A semiconductor ingot is positioned within the central hole of the blade and the the blade is rotated. The ingot is then forced against the rotating cutting surface of the blade. Proper tensioning of the blade with this technique is quite difficult and the blade is subject to an unacceptable amount of wander. Vibrations of the blade tend to produce a surface finish on the wafers which requires a subsequent polishing operation.

Another technique employs a gang of circular blades, each having its outer circumference coated with an abrasive material. The blades are rotated against a semiconductor ingot which is also rotated. With this technique, the resulting wafers are left with a fracture defect at their centers. These defects must then be removed by a subsequent grinding operation.

Yet another technique employs a gang of high strength, typically steel, flat blades or wires which are coated with an abrasive material. A wafering machine for performing this technique is described in U.S. Pat. No. 3,272,195 entitled "Device for Slicing Crystalline Material" issued Sept. 13, 1966 to J. H. Myer et al. Assemblies of flat blades adapatable for use in such a device are described in U.S. Pat. No. 3,168,087 entitled "Wafering Machine" issued Feb. 2, 1986 to R. W. Anderson and in U.S. Pat. No. 3,263,669 entitled "Wafering Machine" issued Jan. 30, 1963 to W. H. Ashley. U.S. Pat. No. 4,187,828 entitled "Cutting" issued Feb. 12, 1980 to Schmid describes a technique for making flat steel or wire blades with an imbedded abrasive on only the leading cutting edge, thereby reducing kerf loss. A cutting element comprising a monofilament polymer charged with abrasive particles adaptable for use with this same general techinque is described in U.S. Pat. No. 4,172,440 entitled "Cutting Monofilament" issued Oct. 30, 1979 to Schneider el al.

Each of the above-mentioned references relates to a technique in which a semiconducter ingot is rigidly held and plunged into the gang of blades or wires as they are reciprocated in a direction perpendicular to the axis of the ingot. Maintaining proper tensioning of the individual blades or wires is difficult. Furthermore, the blades or wires are frequently prone to uneven abrasive impregnation and premature abrasive pullout.

A similar technique employs a gang of high strength, flat steel blades which are not coated with an abrasive. Blade assemblies for use with this technique are described in U.S. Pat. No. 4,092,971 entitled "Self-Contained, Multi-Blade Package for Slurry Saws and the Like" issued June 6, 1978 to Viscount and in U.S. Pat. No. 4,387,698 entitled "Slurry Saw Blade Head Assembly" issued June 14, 1983 to Bustany. A slurry of abrasive particles suspended in water or oil is introduced between a semiconductor ingot and the blades. As in the previous technique, the gang of blades is reciprocated in a direction perpendicular to the axis of the ingot. This technique results in relatively uneven cutting action which causes a poor surface finish on the wafers. As with the blades or wires used in the previously described technique, it is difficult to achieve proper tensioning and spacing of the blades.

A more recently developed technique employs a laser beam to cut through a rigidly held semiconductor ingot. This technique requires an exceptionally large capital investment and provides a relatively low rate of production. Furthermore, the heat of the cutting action tends to damage the crystallinity of the semiconductor wafers.

BRIEF SUMMARY OF THE INVENTION

The primary objects of the present invention are to provide a cutting blade and process that produces a thinner kerf, higher quality surface finish and lower cost per cut than blades and processes heretofore available.

The present invention employs cutting blades comprising two or more layers of commercially available boron-epoxy composite tape of the type commonly known as "Prepreg". The layers are arranged to achieve a multidirectional orientation of the fibers and are compacted together with a fine mesh diamond powder which is impregnated on the two outermost surfaces. Blades are cut from the resulting material and are held at both ends in holding fixtures. The holding fixtures are molded in place around the ends of the blades and encase a metal holding plate.

The holding plates are connected to a source of reciprocating motion. A workpiece, such as a semiconductor ingot, is fed upwards into the reciprocating cutting blades while water is sprayed as a coolant. Exposed fibers at the blade edge provide the primary cutting action. The abrasive coating impregnated on the sides of the blades provides a side grinding action necessary for the blades to cut through the workpiece and simultaneously polishes the surfaces of the resulting wafers.

BRIEF DESCRIPTION OF THE DRAWINGS

FIG. 4 is a perspective view of the wafering blade assembly of the present invention during fabrication.

FIG. 5 illustrates a jig useful during the fabrication shown in FIG. 4.

FIGS. 6a–6b are sectional and plan views respectively of a holding plate of the present invention.

DETAILED DESCRIPTION OF THE PREFERRED EMBODIMENT

In the following description, for purposes of explanation, specific materials and configurations are set forth in order to provide a thorough understanding of the present invention. However, it will be apparent to one skilled in the art that the present invention may be practiced without these specific details.

Figure 1:
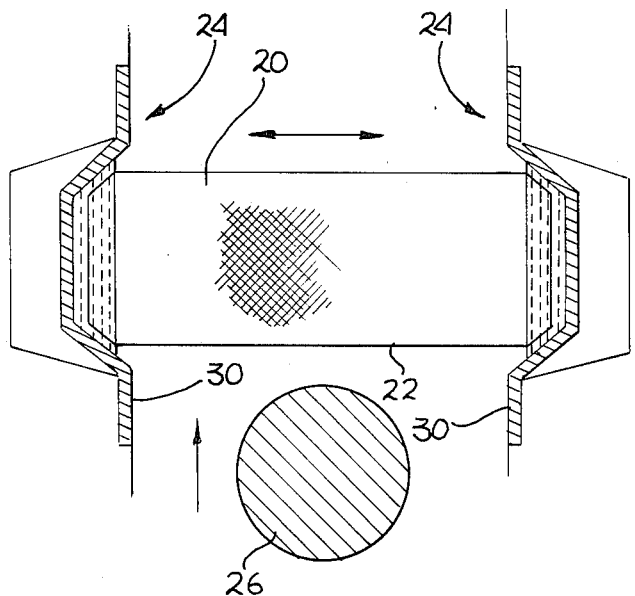
FIG. 1 is a simplified view of a wafering blade assembly of the present invention.
Figure 7:
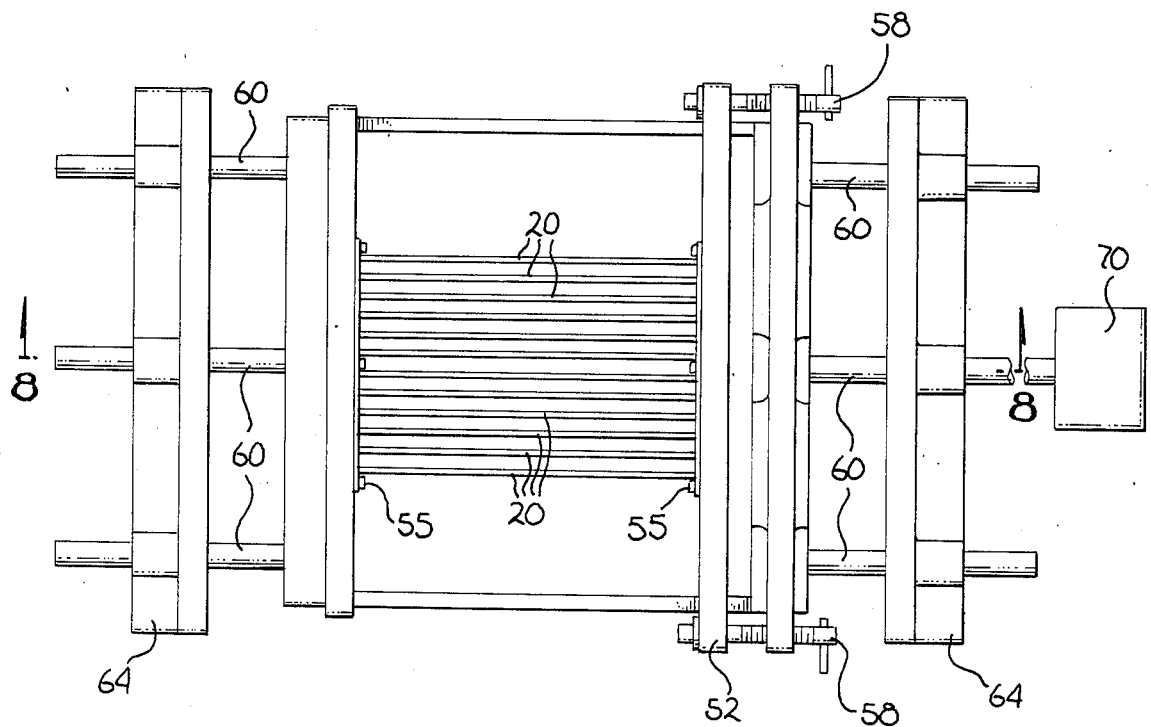
FIG. 7 is a plan view of a wafering apparatus according to the present invention.
Figure 8:
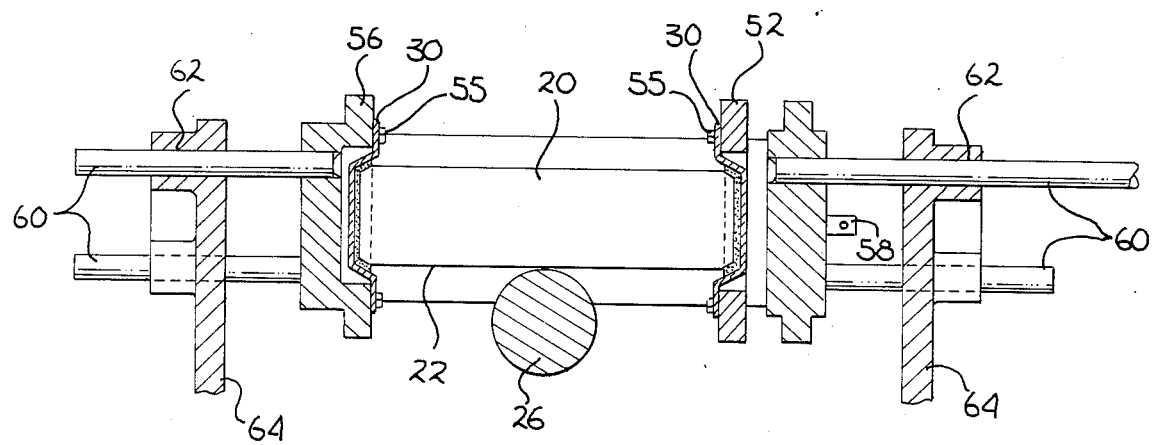
FIG. 8 is a cross section through line 8—8 of FIG. 7.

FIGS. 1, 7 and 8 generally illustrate the present invention. A plurality of blades 20, which will be more fully described below, are secured at each end thereof to holding fixtures 24 such that each blade is parallel to the plane of FIG. 1. As best shown in FIG. 7, fixtures 24 are attached to bars 52 and perimeter frame 56 by screws 55. Bars 52 are free to move with respect to frame 56 and are coupled thereto by screws 58. With holding fixtures 24 attached to bars 52 and frame 56, screws 58 are rotated to place blades 20 in tension. A sufficient tensioning force is applied such that blades 20 are uniformly taut. It is to be recognized that the amount of tensioning force applied is highly dependent upon the particular materials from which blades 20 are fabricated and also upon the characteristics of the material to be wafered. It is important that a sufficient force be applied to minimize blade wander during cutting without causing blades 20 to separate from holding fixtures 24.

Bars 52 and frame 56 must be sufficiently rigid that they will not distort under the forces applied to place blades 20 in tension. The materials of which bars 52 and frame 56 are made and the dimensions of these components are not critical except that they be appropriately sized to accomodate blades 20 and fixtures 24. Frame 56 is supported by rods 60 which extend throuh holes 62 in structure 64. Holes 62 are of a size such that rods 60 slide freely therewithin with a minimum of radial play. Rods 60 are disposed to minimize any rotational motion of frame 56 relative to structure 64. A source of reciprocating motion 70, such as an arrangement of motor, crankshaft and connecting rod or other well known mechanism, is connected to one or more of rods 60.

A workpiece, such as ingot 26 of a material such as silicon, quartz, gallium arsenide, or other crystalline material, is thrust upwards against edges 22 of blades 20. Due to the abrasive properties of the materials of which blades 20 are constructed, wafers are cleanly cut from ingot 26 as blades 20 pass therethrough.

As recognized by those skilled in the art, the speed at which blades 20 are reciprocated will be determined largely by the properties of the material of ingot 26. In practice, it has been found that a cutting stroke of approximately ½ inch with approximately 1500 strokes per minute provides satisfactory results. In order to avoid subjecting ingot 26 to excessive heat buildup during a cutting operation which may adversely affect its crystalline properties, a coolant, such as water, may be sprayed upon ingot 26 while it is cut.

Figure 2:
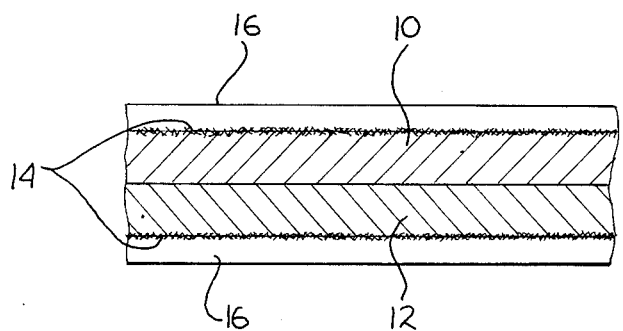
FIG. 2 is a cross sectional view of the blade material of the present invention.

FIG. 2 illustrates the lay-up of materials from which the cutting blades of the present invention are fabricated. Layers 10 and 12 are a fiber reinforced resin material which is commonly known as "Prepreg". The fiber material should have high tensile strength and should possess good abrasive properties in order to achieve the desired cutting action. The preferred fiber material is boron, however, other materials possessing similar properties may be used. It may be advantageous to combine two or more different fiber materials having different properties in the same or different layers in order to obtain a broader range of material characteristics. Ideally, each layer will have a unidirectional fiber orientation. A boron-epoxy Prepreg tape such as that available from Avco Specialty Materials of Lowell, Mass. as part number 5521/4 or 5505/4 is used in the preferred embodiment. This material is approximately 6 inches in width and approximately 0.004 inches hick.

While the present invention is described using epoxy as a resin, it is to be recognized that other resins have certain desirable properties which recommend their use with this invention. In particular, urethane resin is known to offer superior abrasion resistance in comparison to epoxy.

Layers 10 and 12 are preferably oriented such that the fibers of the respective layers are at 90 degree angles, although other angles of orientation may also be suitable. Layers 10 and 12 are placed together and abrasive material 14, such as diamond powder of 1-2 micron size, is distributed on the surface of layer 10. Other abrasive materials, such as boron whiskers, may also be used. A sheet of suitable release material 16, such as the polymeric material sold under the trademark "TEFLON", is then placed over the abrasive material. Material 16 must be stable at the temperatures described below and must not bond to the resin of layer 10. The combination of layers 10, 12, 14 and 16 is then turned upside down and the process repeated to obtain a coating of abrasive material 14 on the surface of layer 12. The resultant sandwich of materials as illustrated in FIG. 1 is then placed under a suitable amount of pressure and placed in an oven until the resin flows and cures, thereby bonding layers 10 and 12 together and causing abrasive material 14 to become embedded in each outer surface of the resin. The particular pressure, temperatures and curing times will depend upon the characteristics of the resin which is employed and may need to be limited to preclude altering the abrasive characteristics of the particular fiber and abrasive material employed. For purposes of laiminating the embodiment previously described comprising layers of boron-epoxy Prepreg and 1-2 micron diamond powder, it has been found that a temperature of 350 degrees Fahrenheit for a minimum of 45 minutes produces satisfactory results. An uncalibrated clamping fixture has been used to apply the required pressure during the laminating process; however, manfacturer's specifications for the Prepreg material used suggest that pressures in the range of 50-85 pounds per square inch are suitable.

Figure 3:
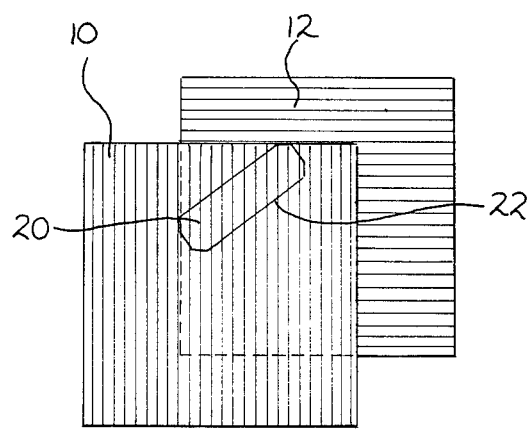
FIG. 3 illustrates a method for achieving the preferred fiber orientation of the blade material of FIG. 2.

After the resin has cured, the resulting blade material is removed from the oven, the "TEFLON" layers 16 are removed and cutting blades of the desired size and orientation are cut from the sheet. FIG. 3 illustrates blade 20 being cut from the blade material described above in the preferred fashion such that cutting edge 22 is at a 45 degree angle to the fibers in both sheet 10 and 12. Other orientations may be obtained by cutting blade 20 at a different angle and by laying up layers 10 and 12 with different orientations.

It is to be understood that the primary cutting action of the present invention is afforded by the exposed ends of the high-strength fibers in the Prepreg or equivalent material. Therefore, it is necessary that the fibers are neither approximately parallel nor approximately perpendicular to cutting edge 22 so that a "chiseling" action at the surface of ingot 26 is achieved. In the preferred embodiment, fibers in adjacent layers are disposed at equal but opposite angles with respect to cutting edge 22 so that a uniform cutting action is achieved during both forward and backward strokes of blades 20.

Once blades of the desired size and orientation have been cut from the abrasive sheet, a gang of blades is assembled. Depending upon the desired number of wafers to be cut in a single operation and the desired thickness of the wafers, the appropriate number of blades 20 are clamped together with spacers (not shown) of a suitable thickness between each blade.

FIG. 4 illustrates the resulting assembly of blades 20 and spacers positioned for fabrication of holding fixture 24. Holding plate 30 provides structural rigidity for holding fixture 24. Holding plate 30 is placed in mold 32 which has cavity 34 into which the ends of the blade assembly extend. Cavity 34 is filled with a suitable liquid resin, such as epoxy, to a level just below flanges 31 of holding plate 30. After the resin has cured, the resulting assembly is removed from mold 32 and the molding operation is repeated at the other end of the assembly.

In lieu of, or in addition to, using spacers, blades 20 may be assembled with holding plates 30 using a jig such as jig 40 as shown in FIG. 5. Jig 40 may be a rigid sheet of material, such as "TEFLON" having a plurality of parallel slots 42 with a uniform separation, d. The dimension d corresponds to the desired wafer thickness. The dimensions of slots 42 correspond to the cross-sectional dimensions of blades 20 so that blades 20 may be maintained in accurate alignment while the resin poured into cavity 34 cures.

Details of holding plate 30 are illustrated in FIGS. 6a–6b. In order to facilitate the molding operation as described above by which blades 20 are secured within holding fixtures 24, holding plates 30 contain a plurality of perforations 38 through which resin may flow. Such perforations insure continuity between the resin material on either side of holding plate 30 so that the resin and holding plate 30 are firmly secured to one another without depending on surface bonding.

In practice it is found that "V" shaped perforations 38 serve an additional function of dampening blade vibrations, thereby producing a smoother surface finish on the wafers produced. While "V" shaped perforations are used in the preferred embodiment, it will be recognized that "U" shaped, "C" shaped or other perforations having a "lip" portion will provide a similar vibration dampening function.

I claim:

1. A blade having a generally linear cutting edge for cutting crystalline materials comprising:
   at least one flat, elongated layer of fiber reinforced plastic having a plurality of substantially parallel abrasive fibers embedded in said plastic such that ends of said fibers are exposed along said cutting edge, said fibers oriented so as to be at an acute angle to said cutting edge; and
   a coating of abrasive material on each flat side of said blade.

2. The blade of claim 1 having a plurality of layers of fiber reinforced plastic, each of said layers having a unidirectional fiber orientation, the direction of said fiber orientation of each of said layers being not approximately parallel to the direction of said fiber orientation of each adjoining layer.

3. The blade of claim 2 wherein each of said layers of fiber reinforced plastic comprises boron fibers in an epoxy resin.

4. The blade of claim 1 wherein said coating of abrasive material comprises abrasive particles imbedded in an outer surface of said fiber reinforced plastic.

5. The blade of claim 4 wherein said abrasive particles are diamond particles.

6. The blade of claim 5 wherein said diamond particles have a size range of approximately 1–2 microns.

7. The blade of claim 4 wherein said abrasive particles are boron whiskers.

8. In an apparatus for cutting wafers from a workpiece having a plurality of elongated flat cutting blades which are reciprocated with respect to the workpiece, each of said blades having a generally linear cutting edge, said apparatus further having holding means attached at each end of each of said blades for holding said blades in a parallel array with a uniform predetermined spacing, the improvement wherein each of said blades comprises at least one layer of fiber reinforced plastic having a plurality of substantially parallel abrasive fibers embedded in said plastic such that ends of said fibers are exposed along said cutting edge, said fibers oriented so as to be at an acute angle to said cutting edge and wherein each of said blades has a coating of abrasive material on each flat side thereof.

9. The improved apparatus of claim 8 wherein said cutting blades have a plurality of layers of fiber reinforced plastic, each of said layers having a unidirectional fiber orientation, the direction of said fiber orientation of each of said layers being not approximately parallel to the direction of said fiber orientation of each adjoining layer.

10. The improved apparatus of claim 9 wherein each of said layers of fiber reinforced plastic comprises boron fibers in an epoxy resin.

11. The improved apparatus of claim 8 wherein said coating of abrasive material comprises abrasive particles imbedded in an outer surface of said fiber reinforced plastic.

12. The improved apparatus of claim 11 wherein said abrasive particles are diamond particles.

13. The improved apparatus of claim 12 wherein said diamond particles have a size range of approximately 1–2 microns.

14. The improved apparatus of claim 11 wherein said abrasive particles are boron whiskers.

15. The improved apparatus of claim 8 wherein said holding means comprises a block of a rigid plastic material molded around and bonded to said ends of said blades and having a holding plate embedded therewithin.

16. The improved apparatus of claim 15 wherein said holding plate includes perforations therethrough.

17. The improved apparatus of claim 16 wherein said perforations are V-shaped.

18. A method for cutting wafers from a workpiece comprising the steps of:
   reciprocating a plurality of elongated flat cutting blades in a direction parallel to a generally linear cutting edge of each of said blades, each of said blades comprising at least one layer of fiber reinforced plastic having a plurality of substantially parallel abrasive fibers embedded in said plastic such that ends of said fibers are exposed along said cutting edge, said fibers oriented so as to be at an acute angle to said cutting edge and further comprising a coating of abrasive material on each flat side of said blades; and thrusting said workpiece against said cutting edges of said blades.

19. The method of claim 18 wherein said workpiece is a crystalline material.

20. The method of claim 19 wherein said crystalline material is a semiconducting material.

21. The method of claim 18 further comprising the additional step of spraying said workpiece with a cooling fluid.

22. The method of claim 21 wherein said cooling fluid is water.

23. The method of claim 18 wherein said blades are held in a parallel array with a uniform predetermined spacing by a holding means attached at each end of each of said blades.

24. The method of claim 18 wherein said cutting blades have a plurality of layers of fiber reinforced plastic, each of said layers having unidirectional fiber orientation, the direction of said fiber orientation of each of said layers being not approximately parallel to the direction of said fiber orientation of each adjoing layer.

25. The method of claim 24 wherein each of said layers of fiber reinforced plastic comprises boron fibers in an epoxy resin.

26. The method of claim 18 wherein said coating of abrasive material comprises abrasive particles imbedded in an outer surface of said fiber reinforced plastic.

27. The method of claim 26 wherein said abrasive particles are diamond particles.

28. The method of claim 27 wherein said diamond particles have a size range of approximately 1-2 microns.

29. The method of claim 26 wherein said abrasive particles are boron whiskers.

30. The method of claim 23 wherein said holding means comprises a block of a rigid plastic material molded around and bonded to said ends of said blades and having a holding plate embedded therewithin.

31. The method of claim 30 wherein said holding plate includes perforations therethrough.

32. The method of claim 31 wherein said perforations are V-shaped.

* * * * *

UNITED STATES PATENT AND TRADEMARK OFFICE
CERTIFICATE OF CORRECTION

PATENT NO. : 4,776,316

DATED : 10-11-88

INVENTOR(S) : Ashkenazi

It is certified that error appears in the above-identified patent and that said Letters Patent is hereby corrected as shown below:

| Column | Line | Correction |
|--------|------|------------|
| 4 | 8 | delete "hick", insert --thick-- |

Signed and Sealed this

Twenty-fifth Day of April, 1989

Attest:

DONALD J. QUIGG

Attesting Officer

Commissioner of Patents and Trademarks